United States Patent [19]

Schumacher et al.

[11] Patent Number: 4,740,424
[45] Date of Patent: Apr. 26, 1988

[54] CURABLE COMPOSITION HAVING HIGH TACK AND GREEN STRENGTH

[75] Inventors: Gerald F. Schumacher; John M. Muggee, both of Stillwater, Minn.

[73] Assignee: Minnesota Mining and Manufacturing Company, St. Paul, Minn.

[21] Appl. No.: 867,528

[22] Filed: May 27, 1986

Related U.S. Application Data

[63] Continuation-in-part of Ser. No. 762,042, Aug. 2, 1985, abandoned.

[51] Int. Cl.$^4$ .......................... B32B 27/06; B32B 27/00
[52] U.S. Cl. .................................. 428/419; 428/423.1; 427/385.5; 427/208.4; 525/129; 525/130
[58] Field of Search ................ 525/129, 130; 428/419, 428/423.1; 427/385.5, 208.4

[56] References Cited

U.S. PATENT DOCUMENTS

| | | |
|---|---|---|
| 3,315,380 | 4/1967 | Mack, III et al. .................. 428/413 |
| 3,337,481 | 8/1967 | Singelyn et al. ..................... 523/167 |
| 3,357,939 | 12/1967 | Reischl et al. ....................... 524/140 |
| 3,381,056 | 4/1968 | Beer ...................................... 525/82 |
| 3,444,266 | 5/1969 | Reischl et al. ....................... 525/129 |
| 3,574,149 | 4/1971 | Harrington ......................... 524/409 |
| 3,594,449 | 7/1971 | Binder ................................ 525/128 |
| 3,637,359 | 1/1972 | Molloy et al. ....................... 524/467 |
| 3,645,933 | 2/1972 | Flint .................................... 523/172 |
| 3,714,077 | 1/1973 | Cobbledick et al. ................. 521/88 |
| 3,718,611 | 2/1973 | Maxey et al. ......................... 521/88 |
| 3,792,000 | 2/1974 | Conger et al. ....................... 523/177 |
| 3,810,851 | 5/1974 | Norman et al. ...................... 521/88 |
| 3,876,571 | 4/1975 | Cobbledick et al. ............... 524/409 |
| 3,882,191 | 5/1975 | Balatoni et al. ..................... 525/125 |
| 3,917,742 | 11/1975 | Harlan ................................. 525/89 |
| 3,929,928 | 12/1975 | Wolf, Jr. et al. ..................... 525/125 |
| 3,931,062 | 1/1976 | Cobbledick ........................... 521/92 |
| 3,947,403 | 3/1976 | McCready ........................... 524/507 |
| 3,970,716 | 7/1976 | Evers et al. ............................ 524/84 |
| 3,981,762 | 9/1976 | Davis et al. ......................... 156/322 |
| 4,162,276 | 7/1979 | Rim et al. ............................ 525/126 |
| 4,173,691 | 11/1979 | Treadwell ........................... 521/124 |
| 4,217,254 | 8/1980 | Legue .................................. 525/130 |
| 4,256,615 | 3/1981 | Legue .................................. 524/507 |
| 4,340,682 | 7/1982 | Legue .................................. 524/507 |

FOREIGN PATENT DOCUMENTS

| | | |
|---|---|---|
| 2644639 | 4/1978 | Fed. Rep. of Germany . |
| 1552992 | 9/1979 | United Kingdom . |

OTHER PUBLICATIONS

"Compatibility of Parlon® Chlorinated Rubber with Hydrocarbon Resins, Alkyds, Reactive Urethanes, and Other Types of Resins", technical publication of Hercules, Inc. (1981).

"TempRite ™ CPVC", technical publication of the B. F. Goodrich Company (1982).

Primary Examiner—Wilbert J. Briggs, Sr.
Assistant Examiner—Robert E. L. Sellers, II
Attorney, Agent, or Firm—Donald M. Sell; James A. Smith; David R. Cleveland

[57] ABSTRACT

Curable compositions useful as adhesives, coatings and sealants, comprising a mixture of (a) isocyanate-functional prepolymer derived from (i) polyisocyanate and (ii) active hydrogen-containing low molecular weight polymer selected from the group consisting of polytetramethylene oxide polyols, polycarbonate polyols, and polysulfide polythiols, and (b) halogenated resin compatible with said prepolymer, said resin containing about 50 to about 70 weight percent halogen.

18 Claims, No Drawings

CURABLE COMPOSITION HAVING HIGH TACK AND GREEN STRENGTH

CROSS-REFERENCE TO RELATED APPLICATION

This application is a continuation-in-part of copending application Ser. No. 762,042, filed Aug. 2, 1985, now abandoned.

TECHNICAL FIELD

This invention relates to curable compositions for use as adhesives, coatings and sealants. This invention also relates to articles having a layer of such curable compositions thereon, and to a method for bonding, coating or sealing such articles using such compositions.

BACKGROUND OF THE INVENTION

U.S. Pat. Nos. 4,217,254, 4,256,615 and 4,340,682 describe adhesive compositions containing mixtures of isocyanate-terminated ricinoleate prepolymer and chlorinated rubber or chlorinated polyvinyl chloride. These compositions are said to have high green strength. The reexamination file for the '682 patent (Reexamination No. 90/000,780, requested May 13, 1985) contains several affidavits, patents and published patent applications relating to polyurethane adhesive compositions containing chlorinated rubber or chlorinated polyvinyl chloride. Among such references is German OLS No. 26 44 639, which mentions, but does not exemplify, adhesives made from polyisocyanates made by mixing various diisocyanates with various glycols or polyether glycols including "tetramethylene glycol". These polyisocyanates are said to be combined with various polyalkylene polyether polyols said to be made by the reaction of "alkylene oxides" (including "butylene oxide") with "suitable starter molecules" such as water or alcohols. Although not specified in the OLS, "butylene oxide" presumably refers to 1,2-butylene oxide, a compound that can react with water in an anionic polymerization. 1,4-Butylene oxide (tetrahydrofuran) does not react with water under such conditions.

U.S. Pat. No. 3,947,403 (McCready) describes adhesives said to have improved Scott brittle points and "good uncured tack or cohesive strength", made from a solvent solution of a polyurethane prepolymer and polyvinylidene chloride. The polyurethane prepolymer is said preferably to be isocyanate-functional. At column 4, lines 36-44 it is said that the adhesive can be made in a "one shot" method using, inter alia, "polytetramethylene ether glycol or triol".

SUMMARY OF THE INVENTION

Adhesives made from many of the glycols and polyalkylene ether polyols recited in the OLS are not compatible with chlorinated rubber or chlorinated polyvinyl chloride. Incompatibility is manifested by phase separation.

The present invention provides curable adhesive, coating and sealant compositions that are compatible and have high tack and high green strength. The compositions of the invention are not disclosed in the above-mentioned references. The compositions of the invention can be one-part moisture-curable or two-part self-curable compositions.

The one-part moisture-curable compositions of the invention comprise a mixture of (a) isocyanate-functional prepolymer derived from (i) polyisocyanate and (ii) active hydrogen-containing low molecular weight polymer selected from the group consisting of polytetramethylene oxide polyols, polycarbonate polyols, and polysulfide polythiols, and (b) halogenated (e.g., chlorinated) resin compatible with said prepolymer, said resin containing about 58 to about 70 weight percent halogen.

The two-part compositions of the invention comprise the above-described isocyanate-functional prepolymer in a first part, isocyanate-reactive material (e.g., water, polyol, polythiol, or polyamine) in a second part and the above-described halogenated resin in said first or said second part, the two parts being intended to be mixed together prior to use.

The present invention also provides articles having thereon a layer or layers of the above-described compositions, and a method for adhering, coating or sealing such articles by applying a layer or layers of such compositions thereto.

DETAILED DESCRIPTION

For brevity, the active hydrogen-containing low molecular weight polymer will hereafter sometimes be referred to as the "active hydrogen polymer". As used herein, an isocyanate-functional prepolymer "derived from" the above-mentioned polyisocyanate and active hydrogen polymer will include prepolymers actually prepared by a reaction between such polyisocyanate and such active hydrogen polymer, and will also be construed to include prepolymers that have not actually been prepared by such a reaction, but have chemical structures that render the prepolymers capable of being prepared from such a reaction if desired. The isocyanate-functional prepolymers are most conveniently prepared by reactions between one or more polyisocyanates and one or more active hydrogen polymers, employing an excess of polyisocyanate to insure that the reaction product contains residual isocyanate groups.

Suitable polyisocyanates include aromatic, aliphatic, and cycloaliphatic polyisocyanates such as 4,4'-diphenylmethane diisocyanate ("MDI"), toluene diisocyanate ("TDI"), xylylene diisocyanate, tetramethylxylene diisocyanate, naphthalene diisocyanate, para-phenylene diisocyanate, tetramethylene diisocyanate, hexamethylene diisocyanate, isophorone diisocyanate, mixtures thereof, and the like. Polymeric polyisocyanates, biurets, blocked polyisocyanates, and mixtures of polyisocyanates with melting point modifiers can also be used. MDI is a particularly preferred polyisocyanate. Suitable commercially available polyisocyanates include "Isonate" 125M and 143L and the series "PAPI 20" through "PAPI 901" polyisocyanates (all commercially available from the Upjohn Co.), "Multrathane M" and "Mondur" CD, M, MR, MRS, and MRS 10, 509, TDS, TD, TD-80, HX, E-448, E-501, E-512, PF, and MT-40 polyisocyanates (all commercially available from Mobay Chemical Corp.), "Rubinate M" polyisocyanate (commercially available from Rubicon Chemicals, Inc.) and "Elate 160" polyisocyanate (commercially available from Akzo Chemie America).

The active hydrogen polymers contain two or more repeating units derived from tetramethylene oxide ($-CH_2CH_2CH_2CH_2O-$), carbonate

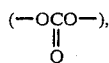

disulfide (—SS—), or mixtures thereof. Preferably such repeating units occur in blocks of two or more. The active hydrogen polymers preferably have two or more active hydrogen atoms (as determined by the Zerewitinoff method) per polymer unit, and preferably have a number average molecular weight between 162 and about 10,000, more preferably between about 300 and about 3000. Polyols are preferred active hydrogen polymers, and polytetramethylene oxide polyether polyols are particularly preferred. Preferably a mixture of both long- and short-chain active hydrogen polymers is employed to prepare the isocyanate-functional prepolymer. Suitable active hydrogen polymers are formed by polymerizing or copolymerizing active hydrogen-containing monomers (or optional comonomers or copolymers), or by employing ring-opening polymerization reactions, to provide a polymeric product containing active hydrogen atoms. For example, polytetramethylene oxide polyether polyols can be prepared using a conventional ring opening polymerization of tetrahydrofuran. Optional active hydrogen-containing comonomers or copolymers that can be used to form the active hydrogen polymer include ethylene glycol, 1,4-butanediol, 1,6-hexanediol, trimethylol propane, pentaerythritol, 1,4-cyclohexane dimethanol and polyetherpolyols. The optional active hydrogen-containing comonomers or copolymers can also be combined separately with the active hydrogen-containing polymer and polyisocyanate when the isocyanate-functional prepolymer is formed.

Suitable commercially available active hydrogen polymers include "Terathane" 650, 1000, 2000 and 2900 polytetramethylene oxide polyether polyols and "Polymer Te1000" alternating copolymer of tetramethylene oxide and ethylene oxide (all commercially available from E. I. duPont de Nemours & Co.), "Duracarb" 120, 122, 140 and 142 polycarbonate polyols (all commercialy available from PPG Industries, Inc.), and LP-2, LP-3, LP-12, LP-31, LP-32 and LP-33 polysulfide polythiols (all commercially available from Thiokol Corp).

The polyisocyanate and active hydrogen polymer are combined using methods well known to those skilled in the art, to form a prepolymer having residual isocyanate groups. The reaction mixture preferably contains a suitable catalyst, and is conducted under anhydrous conditions. The progress of the reaction can be followed using infrared ("IR") spectroscopy to monitor the size of the NCO peak. For MDI-based prepolymers, a useful procedure is to mix the MDI and a suitable solvent (e.g., 1,2-dichloroethane) at room temperature. Next, the active hydrogen polymer(s) (or mixture thereof with comonomer(s) or copolymer(s)) are added to the MDI solution in four equal portions at 45 minute intervals. The resulting mixture can be mixed overnight at room temperature to ensure completion of the reaction.

The halogenated resin is compatible with the isocyanate-functional prepolymer. As used herein, the term "compatible" refers to a halogenated resin that, when in admixture with the isocyanate-functional prepolymer and an optional solvent of the type described below, forms a single phase liquid solution that persists in such single phase at room temperature for a sufficiently long time period to enable the mixture to be shipped and used in commerce (e.g., one month or more).

Suitable halogenated resins include chlorinated polyisoproprene, postchlorinated polyvinyl chloride ("CPVC"), copolymers of halogenated monomers and copolymerizable monomers, mixtures thereof, and the like. Chlorinated resins are preferred, and chlorinated polyisoprene resins are most preferred. The halogenated resin contains at least about 58 to about 70 weight percent chlorine, more preferably about 63 to about 70 weight percent chlorine.

Suitable commercially available halogenated resins include "Parlon" S10, S20, S125, and S300 chlorinated polyisoprene resins (Hercules, Inc.), "Alloprene" 5, 10, 20, 40 and 125 chlorinated polyisoprene resins (ICI Americas, Inc.) and "TempRite" 623×563, 625×563, and 627×563 CPVC resins (B. F. Goodrich Co.).

The halogenated resin conveniently is combined with the prepolymer by mixing them neat (in instances where the halogenated resin is compatible without the use of a solvent), or by first dissolving the halogenated resin in one or more suitable solvents, and then combining the resulting solution with any desired adjuvants (e.g., stabilizers or catalysts). Next, the prepolymer is added with stirring to form a uniform mixture. The halogenated resin, prepolymer, and optional solvent preferably are mixed under anhydrous conditions (e.g., a nitrogen atmosphere).

Suitable solvents include acetone, dichloromethane, dichloroethane, methyl ethyl ketone, N-methyl pyrrolidinone, tetrahydrofuran, toluene, xylene, mixtures thereof, and the like. The amount of solvent employed should be sufficient to dissolve the halogenated resin and provide the desired final viscosity for the mixture of halogenated resin and prepolymer.

The amount of prepolymer and halogenated resin in compositions of the invention preferably is an amount sufficient to provide the desired level of handling and bonding performance before and after cure. In general, the prepolymer and halogenated resin can be combined in a weigh ratio between about 1:9 and 9:1, based upon the weight of solids. A preferred weight ratio of prepolymer to halogenated resin is about 1:1 to 9:1.

The compositions of the invention can contain adjuvants of the type customarily employed in adhesives, coatings, and sealants. Suitable adjuvants include extending and reinforcing fillers, pigments, UV stabilizers, UV absorbers, antioxidants, acid scavengers, catalysts, plasticizers, tackifying resins, wetting aids, surfactants, adhesion promoters, dessicants, and the like. The types and amounts of such adjuvants typically are chosen empirically using techniques familiar to those skilled in the art. Compositions of the invention can be put up in packages in accordance with techniques known to those skilled in the art. Suitable packages include, for example, caulking tubes, screw-topped squeezable tubes, cans, drums and the like.

The one-part compositions of the invention are cured by exposure to ambient water, e.g., water vapor or moisture. The two-part compositions of the invention self-cure soon after the two parts are mixed together. In a preferred two-part composition, the prepolymer, halogenated resin, and one or more emulsifying surfactants are combined to form the first part, water is used as the second part, and the two parts are mixed shortly before use under high shear conditions to form a water-based emulsion or dispersion. For both the one-part and two-part compositions of the invention, heat or high humidity will accelerate cure, and low temperatures or low humidity will retard cure. Bonds to damp substrates (e.g., wood) typically cure faster than bonds to dry substrates (e.g., glass).

The compositions of the invention can be employed in any application where a high-performance, high green strength adhesive, coating or sealant is desired. One such use is in the manufacture of adhesively-bonded laminates, where the high green strength of the compositions of the invention permits substrate memory (e.g., warp) to be overcome, thereby simplifying fixturing, reducing fixturing time, and boosting production. The compositions of the invention are also useful where single surface application and moderate curing temperatures are desired. The compositions of the invention can be applied to a variety of articles and substrates, e.g., glasses, metals, plastics, woods, leathers, masonry, textiles and the like. Typical applications include the manufacture of wood-to-wood, wood-to-plastic, and plastic-to-plastic laminates such as plywood, insulated foam panels, and skis. Other applications include building construction (e.g., structural adhesives, panel adhesives, moisture barriers, and glazing sealants), coatings (e.g., deck coatings and roof membranes), and automotive interior assembly.

The following examples are offered to aid understanding of the present invention and are not to be construed as limiting the scope thereof. Unless otherwise indicated, all parts and percentages are by weight. In the examples, several compositions of the invention and comparison compositions we evaluated for green strength and tack using a dead load tensile test and a subjective tack test, and evaluated for bond strength using an overlap shear strength test and a 90° peel test.

The dead load tensile test was performed by brushing a 0.2 to 0.3 mm thick wet film of the composition onto one face of a 25 mm wide by 100 mm long by 3.2 mm thick fiber-reinforced plastic ("FRP") coupon. The wet film was allowed to stand for a specified open time at 24° C. and 50% relative humidity. A second, noncoated coupon was placed perpendicular and in bonding relationship with the first coupon to provide a cross-shaped assembly with a 25 mm by 25 mm bonded area. The cross-shaped assembly was suspended horizontally (from the ends of the upper coupon) between a pair of vertical knife-edge supports. A 500 gram weight was suspended from the bottom coupon, and the assembly was allowed to stand at room temperature. The elapsed time until bond failure (or the absence of failure after 30 minutes) was recorded.

The subjective tack test was performed by placing a fingertip against a film of the composition after the film had been permitted to stand (at 24° C. and 50% relative humidity) until it became tacky. Tack was evaluated on a scale of "0" to "5", with a rating of zero being assigned to films with no tack and a rating of five being assigned to films with tack equivalent to the bond that forms between surfaces coated with a neoprene contact adhesive.

The overlap shear strength test was performed by applying a 0.2 to 0.3 mm thick wet film of the composition to a 25 mm wide by 100 mm long by 15.9 mm thick wooden or 3.2 mm thick plastic coupon. After a specified open time at a specified temperature and 50% relatively humidity, one end of a second, noncoated coupon was overlapped with one end of the first coupon to provide a 25 mm×25 mm (in some cases 12.5 mm by 25 mm) bonded area. The assembly was allowed to cure for 7 days at 24° C. and 50% relative humidity, then pulled apart using an "Instron" or a "Thwing-Albert" tensile tester operated at a crosshead separation rate of 5 mm/min.

The 90° peel strength test was performed by applying a 0.2 to 0.3 mm thick wet film of the composition to a 25 mm wide by 254 mm long by 3.2 mm thick FRP coupon. After a specified open time at a specified temperature and 50% relative humidity, a 25 mm wide by 254 mm long by 1 mm thick ABS coupon was laminated onto the coated face of the FRP coupon. The resulting assembly was passed through a nip roller, allowed to cure at 24° C. and 50% relative humidity for 7 days, then pulled apart at a peel angle of 90° using an Instron tensile tester operated at a crosshead separation rate of 51 mm/min.

Prepolymer Examples 1 through 20

In a series of runs, a polyisocyanate, a mixture of short- and long-chain active hydrogen polymers and a solvent were combined to form a series of isocyanate-functional prepolymers. Set out below in Table I are the Prepolymer Example No., type and amount (expressed in terms of NCO equivalents) of polyisocyanate, type and amount (expressed in terms of OH equivalents) of active hydrogen-containing material, solvent, and percent solids obtained. The compositions of Prepolymer Example Nos. 12, 13, 14, and 15 contained 0.14, 0.14, 0.33, and 0.33 weight percent respectively of "Epon 828" epoxide (commercially available from Shell Chemical Co.) as a stabilizer.

TABLE I

| Prepolymer Example No. | Polyisocyanate | | Active hydrogen polymer | | Solvent | % Solids |
|---|---|---|---|---|---|---|
| | Type | Amount | Type | Amount | | |
| 1 | TDI | 3.25 eq | T1000 | 1 eq | toluene | 90–93 |
| | | | BD | 0.26 eq | | |
| | | | TMP | 0.26 eq | | |
| 2 | MDI | 3.25 eq | T1000 | 1 eq | toluene | 90–94 |
| | | | BD | 0.26 eq | | |
| | | | TMP | 0.26 eq | | |
| 3 | TDI | 3.25 eq | T2000 | 1 eq | toluene | 90–92 |
| | | | BD | 0.26 eq | | |
| | | | TMP | 0.26 eq | | |
| 4 | MDI | 3.25 eq | T2000 | 1 eq | toluene | 90–92 |
| | | | BD | 0.26 eq | | |
| | | | TMP | 0.26 eq | | |
| 5 | MDI | 3.25 eq | T1000 | 1 eq | DCM | 80 |
| | | | BD | 0.26 eq | | |
| | | | TMP | 0.26 eq | | |
| 6 | MDI | 3.25 eq | T1000 | 0.8 eq | DCM | 80 |
| | | | PCP0230 | 0.2 eq | | |
| | | | BD | 0.26 eq | | |
| | | | TMP | 0.26 eq | | |
| 7 | MDI | 3.25 eq | T1000 | 0.6 eq | DCM | 80 |
| | | | PCP0230 | 0.4 eq | | |
| | | | BD | 0.26 eq | | |
| | | | TMP | 0.26 eq | | |
| 8 | MDI | 3.25 eq | T1000 | 0.4 eq | DCM | 80 |
| | | | PCP0230 | 0.6 eq | | |
| | | | BD | 0.26 eq | | |
| | | | TMP | 0.26 eq | | |
| 9 | MDI | 3.25 eq | T1000 | 0.2 eq | DCM | 80 |
| | | | PCP0230 | 0.8 eq | | |
| | | | BD | 0.26 eq | | |
| | | | TMP | 0.26 eq | | |
| 10 | MDI | 3.25 eq | T1000 | 1 eq | THF | 80 |
| | | | BD | 0.26 eq | | |
| | | | TMP | 0.26 eq | | |
| 11 | MDI | 3.25 eq | T1000 | 1 eq | DCE | 80 |
| | | | BD | 0.26 eq | | |
| | | | TMP | 0.26 eq | | |
| 12 | MDI | 3.25 eq | T1000 | 1 eq | DCE | 67 |
| | | | BD | 0.26 eq | | |
| | | | TMP | 0.26 eq | | |

TABLE I-continued

| Prepolymer Example No. | Polyisocyanate Type | A-mount | Active hydrogen polymer Type | Amount | Solvent | % Solids |
|---|---|---|---|---|---|---|
| 13 | MDI | 3.25 eq | D122 | 1 eq | DCE | 67 |
|    |     |         | BD   | 0.26 eq |   |   |
|    |     |         | TMP  | 0.26 eq |   |   |
| 14 | MDI | 3.25 eq | LP3  | 1 eq | DCE | 67 |
|    |     |         | BD   | 0.26 eq |   |   |
|    |     |         | TMP  | 0.26 eq |   |   |
| 15 | MDI | 3.25 eq | C1000 | 1 eq | DCE | 67 |
|    |     |         | BD   | 0.26 eq |   |   |
|    |     |         | TMP  | 0.26 eq |   |   |
| 16 | TDI | 3.25 eq | PPG1025 | 1 eq | toluene | 93 |
|    |     |         | BD   | 0.26 eq |   |   |
|    |     |         | TMP  | 0.26 eq |   |   |
| 17 | MDI | 3.25 eq | PPG1025 | 1 eq | toluene | 94 |
|    |     |         | BD   | 0.26 eq |   |   |
|    |     |         | TMP  | 0.26 eq |   |   |
| 18 | MDI | 2.16 eq | BD   | 1 eq | 50:50 THF:MEK | 54 |
| 19 | MDI | 2.16 eq | T1000 | 0.66 eq | toluene | 67 |
|    |     |         | BD   | 0.17 eq |   |   |
|    |     |         | TMP  | 0.17 eq |   |   |
| 20 | MDI | 3.25 eq | T1000 | 1 eq | — | 100 |
|    |     |         | BD   | 0.26 eq |   |   |
|    |     |         | TMP  | 0.26 eq |   |   |

Key to entries in table:
TDI = Mixture of 2,4- and 2,6-toluene diisocyanate.
MDI = 4,4'-Diphenylmethane diisocyanate.
T1000 = "Terathane 1000", a 1000 M.W. poly(tetramethylene oxide) diol (commercially available from E. I. duPont de Nemours & Co.).
T2000 = "Terathane 2000", a 2000 M.W. poly(tetramethylene oxide) diol (commercially available from E. I. duPont de Nemours & Co.).
BD = 1,4-Butanediol.
TMP = Trimethylolpropane.
PCP0230 = "Niax PCP 0230", a 1260 M.W. poly(epsilon-caprolactone) diol (commercially available from Union Carbide Corp.).
DCM = Dichloromethane.
DCE = 1,2-Dichloroethane.
D122 = "Duracarb 122", a linear aliphatic polycarbonate polyol (commercially availble from PPG Industries, Inc.).
LP3 = "LP-3" polysulfide polythiol (commercially available from Thiokol Corp.).
C1000 = "Carbowax 1000", a 1000 M.W. poly(ethylene oxide) diol (commercially available from Union Carbide Corp.).
PPG1025 = "PPG 1025", a 1000 M.W. poly(propylene oxide) diol (commercially available from Union Carbide Corp.).
THF = Tetrahydrofuran.
MEK = methyl ethyl ketone.

EXAMPLES 1 THROUGH 23 AND COMPARISON EXAMPLES 1 THROUGH 16

In a series of runs, an isocyanate-functional prepolymer, a halogenated resin, and one or more solvents were combined to form uniform mixtures and evaluated for compatibility. Set out below in Table II are the Example number or Comparison Example ("C.E.") number, type of prepolymer (identified by "P.E." number, an abbreviation for "Prepolymer Example"), weight percent of prepolymer (based on a comparison of prepolymer solids weight to the total mixture weight), type and weight percent of halogenated resin (similarly expressed), type of solvent, weight percent of solvent (based on a comparison of the solvent weight to the total mixture weight), and an indication of whether or not the halogenated resin was compatible with the prepolymer. The compositions of Examples 12, 14–16, 18, 20, and Comparison Examples 1, 3–5 and 10 each contained 0.016 weight % dibutyltin dialurate. The composition of Example 13 contained 0.47 weight % each of dilaurylthiodipropionate and tributylphosphite, 0.11 weight % 2,6-di-t-butyl-4-methyl phenol, and 0.02 weight % dibutyltin dilaurate. The compositions of Example 19 and Comparison Example 9 each contained 0.027 weight % dibutyltin dialurate. The composition of Example 21 contained 0.07 weight % "ERL 4221" epoxide (commercially available from Union Carbide Corp.), 0.05 weight % "FC-430" fluorosurfactant (commercially available from 3M), 0.04 weight % each of "Irganox 1010" hindered phenol (commercially available from Ciba-Geigy Corp.) and "Weston 619" diphosphite (commercially available from Borg-Warner Corp.), and 0.03 weight % dibutyltin dilaurate. The compositions of Examples 22 and 23 and Comparison Examples 15 and 16 each contained 0.032 weight % dibutyltin dilaurate. The compositions of Comparison Examples 2 and 13 each contained 0.013 weight % dibutyltin dilaurate. The composition of Comparison Example 14 contained 0.02 weight % dibutyltin dilaurate.

TABLE II

| Ex. No. | Prepolymer Type | Weight % | Halogenated resin Type | Weight % | Solvent(s) Type | Weight % | Compatible |
|---|---|---|---|---|---|---|---|
| 1 | P.E.1 | 63 | S300 | 8 | Toluene | 29 | yes |
| 2 | P.E.2 | 64 | S300 | 8 | Toluene | 28 | yes |
| 3 | P.E.3 | 62 | S300 | 8 | Toluene | 30 | yes |
| 4 | P.E.4 | 63 | S300 | 8 | Toluene | 29 | yes |
| 5 | P.E.5 | 45 | S300 | 5 | DCM | 27 | yes |
|   |       |    |      |   | MEK | 23 |   |
| 6 | P.E.6 | 45 | S300 | 5 | DCM | 30 | yes |
|   |       |    |      |   | MEK | 20 |   |
| 7 | P.E.7 | 45 | S300 | 5 | DCM | 30 | yes |
|   |       |    |      |   | MEK | 20 |   |
| 8 | P.E.8 | 45 | S300 | 5 | DCM | 30 | yes |
|   |       |    |      |   | MEK | 20 |   |
| 9 | P.E.9 | 45 | S300 | 5 | DCM | 30 | yes |
|   |       |    |      |   | MEK | 20 |   |
| 10 | P.E.10 | 45 | S300 | 5 | THF | 50 | yes |
| 11 | P.E.11 | 45 | S300 | 5 | DCE | 30 | yes |
|    |        |    |      |   | MEK | 20 |   |
| 12 | P.E.12 | 27 | S300 | 12 | DCE | 13 | yes |
|    |        |    |      |    | MEK | 47 |   |
| 13 | P.E.12 | 27 | S300 | 12 | DCE | 13 | yes |
|    |        |    |      |    | MEK | 47 |   |
| 14 | P.E.12 | 27 | TR623 | 3 | DCE | 13 | yes |
|    |        |    |       |   | THF | 57 |   |
| 15 | P.E.12 | 35 | TR625 | 4 | DCE | 17 | yes |
|    |        |    |       |   | THF | 43 |   |
| 16 | P.E.12 | 35 | TR627 | 4 | DCE | 17 | yes |

TABLE II-continued

| Ex. No. | Prepolymer Type | Weight % | Halogenated resin Type | Weight % | Solvent(s) Type | Weight % | Compatible |
|---|---|---|---|---|---|---|---|
| 17 | P.E.12 | 28 | A40 | 12 | THF | 43 | yes |
|  |  |  |  |  | MEK | 60 |  |
| 18 | P.E.13 | 27 | S300 | 12 | DCE | 13 | yes |
|  |  |  |  |  | MEK | 47 |  |
| 19 | P.E.14 | 45 | S300 | 5 | DCE | 50 | yes |
| 20 | P.E.14 | 27 | S300 | 12 | DCE | 61 | yes |
| 21 | P.E.19 | 27 | S300 | 12 | Toluene | 13 | yes |
|  |  |  |  |  | MEK | 47 |  |
| 22 | P.E.20 | 28 | S300 | 12 | THF | 60 | yes |
| 23 | P.E.20 | 28 | TR627 | 12 | THF | 60 | yes |
| C.E.1 | P.E.12 | 24 | NAC | 11 | DCE | 12 | no |
|  |  |  |  |  | MEK | 53 |  |
| C.E.2 | P.E.12 | 22 | NAC | 10 | DCE | 11 | no |
|  |  |  |  |  | THF | 57 |  |
| C.E.3 | P.E.12 | 27 | H20 | 12 | DCE | 14 | no |
|  |  |  |  |  | MEK | 47 |  |
| C.E.4 | P.E.12 | 27 | H20 | 12 | DCE | 14 | no |
|  |  |  |  |  | THF | 47 |  |
| C.E.5 | P.E.12 | 27 | VMCH | 12 | DCE | 14 | NTGS |
|  |  |  |  |  | MEK | 47 |  |
| C.E.6 | P.E.12 | 18 | G121 | 2 | DCE | 9 | no |
|  |  |  |  |  | THF | 71 |  |
| C.E.7 | P.E.12 | 16 | G121 | 4 | DCE | 8 | no |
|  |  |  |  |  | THF | 72 |  |
| C.E.8 | P.E.12 | 14 | G121 | 6 | DCE | 7 | NTGS |
|  |  |  |  |  | THF | 73 |  |
| C.E.9 | P.E.15 | 49 | S300 | 5 | DCE | 24 | no |
|  |  |  |  |  | MEK | 22 |  |
| C.E.10 | P.E.15 | 27 | S300 | 12 | DCE | 14 | no |
|  |  |  |  |  | MEK | 47 |  |
| C.E.11 | P.E.16 | 63 | S300 | 8 | Toluene | 29 | no |
| C.E.12 | P.E.17 | 63 | S300 | 8 | Toluene | 29 | no |
| C.E.13 | P.E.18 | 18 | S300 | 2 | MEK | 16 | NTGS |
|  |  |  |  |  | THF | 64 |  |
| C.E.14 | P.E.20 | 18 | G121 | 8 | THF | 75 | NTGS |
| C.E.15 | P.E.20 | 28 | SF310 | 12 | THF | 60 | no |
| C.E.16 | P.E.20 | 28 | SF310 | 12 | THF | 12 | no |
|  |  |  |  |  | MEK | 48 |  |

Key to entries in table:
S300 = "Parlon" S300 chlorinated polyisoprene (commercially available from Hercules, Inc.).
DCM = Dichloromethane.
DCE = 1,2-Dichloroethane.
MEK = Methyl ethyl ketone.
THF = Tetrahydrofuran.
TR 623 = "TempRite" 623 × 653 CPVC resin (commercially available from the B. F. Goodrich Co.).
TR 625 = "TempRite" 625 × 653 CPVC resin (commercially available from the B. F. Goodrich Co.).
TR 627 = "TempRite" 627 × 653 CPVC resin (commercially available from the B. F. Goodrich Co.).
A40 = "Alloprene" 40 chlorinated polyisoprene resin (commercially available from ICI, America, Inc.).
NAC = "Neoprene" AC polychlorobutadiene, containing 39.2 weight % chlorine (commercially available from E. I. Dupont de Nemours & Co.).
H20 = "Hypalon" 20 chlorosulfonated polyethylene, containing 27 to 31% chlorine (commercially available from E. I. DuPont de Nemours & Co.).
VMCH = "Vinylite" VMCH 86/14 vinyl chloride/vinyl acetate copolymer, containing 46.4 weight % chlorine (commercially available from Union Carbide Corp.).
G121 = "Geon" 121 polyvinyl chloride resin, containing 56.8% chlorine (commercially available from the B. F. Goodrich Co.).
SF310 = "Saran" F310, believed to be a copolymer of vinylidene chloride with acrylonitrile or methacrylaonitrile, and believed to contain about 56.7 weight % chlorine (commercially available from Dow Chemical Co.).
NTGS = Mixture appeared to be compatible, but no improvement in tack or green strength was noted.

These examples illustrate formation of compatible mixtures from a variety of isocyanate-functional prepolymers and halogenated resins. For each Example a film of the isocyanate-functional prepolymer alone had no tack, whereas a film of the compatible mixture was tacky within a few minutes after coating. Tackiness generally reached a maximum value within about 20 to 30 minutes at room temperature, then diminished as the film cured. These mixtures contained halogenated resins whose halogen content was between about 58 and about 70 weight percent.

For each Comparison Example, the mixture was incompatible, or compatible but non-tacky and lacking in green strength. These mixtures contained halogenated resins whose halogen content was less than about 58 weight percent (Comparison Examples 1–8 and 14–16), or were prepared from prepolymers derived from polyethylene oxide diol (Comparison Examples 9 and 10), polypropylene oxide diol (Comparison Examples 11 and 12) or 1,4-butanediol (Comparison Example 13).

EXAMPLE 21

Dead load tensile test

The compositions of Example Nos. 11 through 23 were evaluated using the above-described dead load tensile test. The compositions of Example Nos. 19 and 20 did not pass the test when a 500 g weight was used but did have enhanced green strength and would have passed using a smaller weight. Set out in Table III below for the compositions of Examples 11 through 18 and 21 through 23 are the open time and the time to failure.

TABLE III

| Composition of Example | Open time, min. | Time to failure, min. |
|---|---|---|
| 11 | 2 | 4 |
|  | 3 | 4 |
|  | 4 | 50% N.F. |
| 12 | 2 | N.F. |
| 13 | 2 | N.F. |
| 14 | 3 | N.F. |
| 15 | 2 | 50% N.F. |
|  | 3 | 75% N.F. |
| 16 | 2 | N.F. |
| 17 | 3 | 50% N.F. |
| 18 | 3 | N.F. |
| 21 | 2 | N.F. |
| 22 | 3 | N.F. |
| 23 | 3 | 75% N.F. |

Key to entries in table:
N.F. = No failure within 30 minutes. 50% N.F. signifies that half of the samples did not fail within 30 minutes, and 75% N.F. signifies that three-fourths of the samples did not fail within 30 minutes.

In each instance, exclusion of the halogenated resin resulted in immediate failure of the dead load tensile test at the same open time. This example illustrates the very useful improvement in green strength that is provided in this invention.

EXAMPLE 22

Subjective tack test and overlap shear test

The compositions of Examples 1 through 12 and 18 were evaluated using the above-described subjective tack test and overlap shear strength test. Set out below in Table IV are the composition employed, test substrates, open time and temperature, subjective tack test result, and overlap shear strength test result for each composition.

TABLE IV

| Composition of Ex. No. | Substrate | Open Time | Open Temp | Subjective tack test | Overlap shear strength, kg/cm$^{2(1)}$ |
|---|---|---|---|---|---|
| 1 | maple/maple | 20 min. | 24° C. | 1 | 55.2[2] |
| 2 | maple/maple | 20 min. | 24° C. | 2 | 143.8[2] |
| 3 | maple/maple | 20 min. | 24° C. | 1 | 49.6[2] |
| 4 | maple/maple | 20 min. | 24° C. | 2 | 59.3[2] |
| 5 | maple/maple | 20 min. | 24° C. | 3 | 64.5 |
|  | PVC/PVC | 20 min. | 24° C. | 3 | 57.1 |
| 6 | maple/maple | 20 min. | 24° C. | 3 | 53.4 |
|  | PVC/PVC | 20 min. | 24° C. | 3 | 62.4 |
| 7 | maple/maple | 20 min. | 24° C. | 3 | 56.0 |
|  | PVC/PVC | 20 min. | 24° C. | 3 | 59.6 |
| 8 | maple/maple | 20 min. | 24° C. | 3 | 62.3 |
|  | PVC/PVC | 20 min. | 24° C. | 3 | 62.1 |
| 9 | maple/maple | 20 min. | 24° C. | 3 | 63.9 |
|  | PVC/PVC | 20 min. | 24° C. | 3 | 64.0 |
| 10 | pine/PVC | 1 min. | 71° C. | 3 | — |
| 11 | ABS/FRP | (3) | (3) | 3 | — |
| 12 | oak/oak | 3 min. | 24° C. | — | 85.8(−40° C.) |
|  | oak/oak | 3 min. | 24° C. | — | 81.6 |
|  | oak/oak | 3 min. | 24° C. | — | 45.0(82° C.) |
|  | FRP/FRP | 3 min. | 24° C. | — | 158.2(−40° C.) |
|  | FRP/FRP | 3 min. | 24° C. | — | 99.8 |
|  | FRP/FRP | 3 min. | 24° C. | — | 59.1(82° C.) |
| 18 | FRP/FRP | 3 min. | 24° C. | — | 39.4(82° C.) |

Key to entries in table:
PVC = Polyvinyl chloride.
ABS = Acrylonitrile-butadiene-styrene plastic.
FRP = Fiber-reinforced plastic (a styrene molding compound containing glass fibers).
Footnotes for entries in table:
[1] 25 mm × 25 mm bond evaluated at 24° C., unless otherwise indicated.
[2] 25 mm wide bond, overlapped 12.5 mm.
[3] open time and temperature were two minutes at room temperature, followed by one minute at 71° C., followed by one minute at room temperature.

For each of the above compositions, a subjective tack test score of zero was obtained when the halogenated resin was excluded. This example shows that tack was enhanced by addition of halogenated resin. Several of the compositions had excellent shear strength at room elevated temperatures.

EXAMPLE 23

90° Peel Strength test

The composition of Example 10 was evaluated using a one minute open time at 72° C. and the above-described 90° peel strength test. At temperatures of −29° C., 24° C. and 82° C. the composition exhibited 90° peel strength values of 1.25, 0.18 and 1.25 kg/cm, respectively.

Various modifications and alterations of this invention will be apparent to those skilled in the art without departing from the scope and spirit of this invention, and the latter should not be restricted to that set forth herein for illustrative purposes.

We claim:

1. A curable composition comprising a mixture of:
   (a) isocyanate-functional prepolymer derived from:
      (i) polyisocyanate, and
      (ii) active hydrogen-containing low molecular weight polymer selected from the group consisting of polytetramethylene oxide polyols, polycarbonate polyols, and polysulfide polythiols, and
   (b) halogenated resin compatible with said prepolymer and dissolved in said prepolymer to form a single phase liquid solution, said resin containing about 58 to about 70 weight percent halogen.

2. A composition according to claim 1, wherein said polyisocyanate comprises 4,4'-diphenylmethane diisocyanate.

3. A comparison according to claim 1, wherein said polymer comprises polytetramethylene oxide polyol.

4. A composition according to claim 3, wherein said polymer contains repeating units derived from tetramethylene oxide, said repeating units occurring in blocks of two or more.

5. A composition according to claim 1, wherein said polymer comprises polycarbonate polyol.

6. A composition according to claim 1, wherein said polymer comprises polysulfide polythiol.

7. A composition according to claim 1, wherein said polymer has a number average molecular weight between 162 and about 10,000.

8. A composition according to claim 1, wherein said polymer has a number average molecular weight between about 300 and about 3000.

9. A composition according to claim 1, wherein said halogen is chlorine.

10. A composition according to claim 9, wherein said resin contains about 63 to about 70 weight percent chlorine.

11. A composition according to claim 9, wherein said resin comprises chlorinated polyisoprene.

12. A composition according to claim 9, wherein said resin comprises postchlorinated polyvinyl chloride.

13. A composition according to claim 1, further comprising solvent.

14. A composition according to claim 13, wherein said prepolymer and said resin are mixed in a weight ratio between about 1:9 and 9:1.

15. A composition according to claim 14, wherein said ratio is between about 1:1 and 1:9.

16. A composition according to claim 1, wherein said mixture is a one-part moisture-curable composition.

17. An article comprising a substrate having thereon a layer or layers of a composition comprising a mixture of:
(a) isocyanate-functional prepolymer derived from:
 (i) polyisocyanate, and
 (ii) active hydrogen-containing low molecular weight polymer selected from the group consisting of polytetramethylene oxide polyols, polycarbonate polyols, and polysulfide polythiols, and
(b) halogenated resin compatible with said prepolymer and dissolved in said prepolymer to form a single phase liquid solution, said resin containing about 58 to about 70 weight percent halogen.

18. A method for adhering, coating or sealing an article, comprising the step of applying thereto a layer or layers of a composition comprising a mixture of:
(a) isocyanate-functional prepolymer derived from:
 (i) polyisocyanate, and
 (ii) active hydrogen-containing low molecular weight polymer selected from the group consisting of polytetramethylene oxide polyols, polycarbonate polyols, and polysulfide polythiols, and
(b) halogenated resin compatible with said prepolymer and dissolved in said prepolymer to form a single phase liquid solution, said resin containing about 58 to about 70 weight percent halogen.

* * * * *

UNITED STATES PATENT AND TRADEMARK OFFICE
CERTIFICATE OF CORRECTION

PATENT NO. : 4,740,424

DATED : April 26, 1988

INVENTOR(S) : SCHUMACHER

It is certified that error appears in the above-identified patent and that said Letters Patent is hereby corrected as shown below:

Col. 3, line 39, Te1000" should be -- TE1000" -- .

Col. 4, line 5, (37 CPVC")" should be -- ("CPVC") --.

Col. 12, line 6, "elevated" should be -- and elevated -- .

Signed and Sealed this

Sixth Day of September, 1988

*Attest:*

DONALD J. QUIGG

*Attesting Officer*  *Commissioner of Patents and Trademarks*